United States Patent [19]
Bradford

[11] Patent Number: 5,785,389
[45] Date of Patent: Jul. 28, 1998

[54] AUTOMOTIVE WHEEL AND WHEEL COVER SHIELD

[76] Inventor: Wendell R. Bradford, P.O. Box 968, Mont. Belvieu, Tex. 77580

[21] Appl. No.: 771,225

[22] Filed: Dec. 20, 1996

[51] Int. Cl.⁶ ........................................ B60B 7/06
[52] U.S. Cl. ........................ 301/37.42; 118/504
[58] Field of Search ............... 301/37.1, 37.42; 118/504, 505

[56] References Cited

U.S. PATENT DOCUMENTS

| | | | |
|---|---|---|---|
| 4,574,731 | 3/1986 | Stevens et al. | 118/504 |
| 4,628,858 | 12/1986 | King et al. | 118/504 |
| 4,811,991 | 3/1989 | Moreno et al. | 301/37 R |
| 4,874,206 | 10/1989 | Sampson | 301/37 R |
| 4,955,670 | 9/1990 | Koller | 301/37 R |
| 5,524,972 | 6/1996 | Cailor et al. | 301/37.42 |

*Primary Examiner*—Jesus D. Sotelo
*Attorney, Agent, or Firm*—Joseph N. Breaux

[57] ABSTRACT

A wheel and wheel cover shield including a resilient shield member having a shielding surface defined partially by a curved shield edge and having a shield surface area less than the surface are of the wheel or wheel cover to be protected, the shield edge having a deformable edge contact band secured there along and extending past the shield edge; and a handle assembly extending from the shield member including a hand grip, a rigid central support rib in fixed connection with a central portion of an outwardly facing surface of the shield member, a first deflectable support rib in fixed connection with a first side edge portion of the outwardly facing surface of the shield member, and a second deflectable support rib in fixed connection with a second side edge portion of the outwardly facing surface of the shield member, the first and second deflectable support ribs being deflectable from a normal radius of curvature in a manner to change the curvature of the shield edge to a deflected radius of curvature that conforms to wheels having a radius measurement between a first and a second predetermined radius value.

7 Claims, 2 Drawing Sheets

5,785,389

AUTOMOTIVE WHEEL AND WHEEL COVER SHIELD

TECHNICAL FIELD

The present invention relates to shielding devices for shielding an object from a liquid spray and more particularly to a shielding device for shielding automotive wheels and wheels covers from spray-on tire cleaning solutions that includes a resilient shield member having a shielding surface defined partially by a curved shield edge and a shield surface area less than the surface area of the wheel or wheel cover to be protected, the shield edge having a deformable edge contact band secured there along and extending past the shield edge; and a handle assembly extending from the shield member including a hand grip, a rigid central support rib in fixed connection with a central portion of an outwardly facing surface of the shield member, a first deflectable support rib in fixed connection with a first side edge portion of the outwardly facing surface of the shield member, and a second deflectable support rib in fixed connection with a second side edge portion of the outwardly facing surface of the shield member, the first and second deflectable support ribs being deflectable in a manner to change the curvature of the shield edge to conform to wheels having a radius of between fourteen and sixteen inches. The shielding device is used by grasping the hand grip and placing the edge contact band running along the shield edge against the edge of the wheel or wheel cover to be protected. Should the wheel cover or wheel have a radius of curvature less than the normal radius of curvature of the shield edge, the first and second deformable ribs are squeezed together changing the curvature of the shield edge sufficiently to fit against a section of the wheel or wheel cover edge in a manner to shield a portion of the wheel or wheel cover. The tire cleaner is then applied to a section of the tire. After application of the tire cleaner to one section of the tire, the shield member is repositioned to cover another portion of the wheel cover or wheel and additional tire cleaner applied. The steps of repositioning the shield member and applying tire cleaner are continued until tire cleaner has been applied to the entire tire.

BACKGROUND OF THE INVENTION

Spray-on chemical tire cleaning solutions and agents conventionally used to clean and condition the pneumatic tires of automobiles, trucks, and the like can seriously damage and/or destroy the appearance of expensive automotive wheels and wheels covers. To protect the wheels and wheel covers, it would be desirable to have a shield device that could be placed over at least a portion of the wheel or wheel cover to protect the wheel or wheel cover from over spray while spraying the cleaning solution onto the tires.

Because auto detailers and people owning a number of automobiles, each having different sized wheels, would require more than one shield, it would be a further benefit to have a wheel and wheel cover shield that could be easily configured to work on a variety of different sized wheels and wheel covers.

SUMMARY OF THE INVENTION

It is thus an object of the invention to provide an automotive wheel and wheel cover shield that can be placed over at least a portion of an automotive wheel or wheel cover to protect the wheel or wheel cover from over spray while spraying tire cleaning solution onto the tires.

It is a further object of the invention to provide an automotive wheel and wheel cover shield that can be configured to work on a variety of different sized wheels and wheel covers.

It is a still further object of the invention to provide an automotive wheel and wheel cover shield that accomplishes both of the above objects in combination.

Accordingly, an automotive wheel and wheel cover shield is provided. The wheel and wheel cover shield comprises a resilient shield member having a shielding surface defined partially by a curved shield edge and a shield surface area less than the surface area of the wheel or wheel cover to be protected, the shield edge having a deformable edge contact band secured there along and extending past the shield edge; and a handle assembly extending from the shield member including a hand grip, a rigid central support rib in fixed connection with a central portion of an outwardly facing surface of the shield member, a first deflectable support rib in fixed connection with a first side edge portion of the outwardly facing surface of the shield member, and a second deflectable support rib in fixed connection with a second side edge portion of the outwardly facing surface of the shield member, the first and second deflectable support ribs being deflectable from a normal outwardly extending position in a manner to change the curvature of the shield edge to a deflected radius of curvature that conforms to wheels having a radius measurement between a first and a second predetermined radius value. The shielding device is used by grasping the hand grip and placing the edge contact band running along the shield edge against the edge of the wheel or wheel cover to be protected. Should the wheel cover or wheel have a radius less than the normal radius of curvature of the shield edge, the first and second deformable ribs are squeezed together until a deflected radius of curvature of the shield edge is achieved that is sufficient to fit against a section of the wheel edge in a manner to shield a portion of the wheel or wheel cover. The tire cleaner is then applied to a section of the tire adjacent to the shielded portion of the wheel or wheel cover. After application of the tire cleaner to this section of the tire, the shield member is repositioned to cover another portion of the wheel cover or wheel and additional tire cleaner applied. The steps of repositioning the shield member and applying tire cleaner are continued until tire cleaner has been applied to the entire tire.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
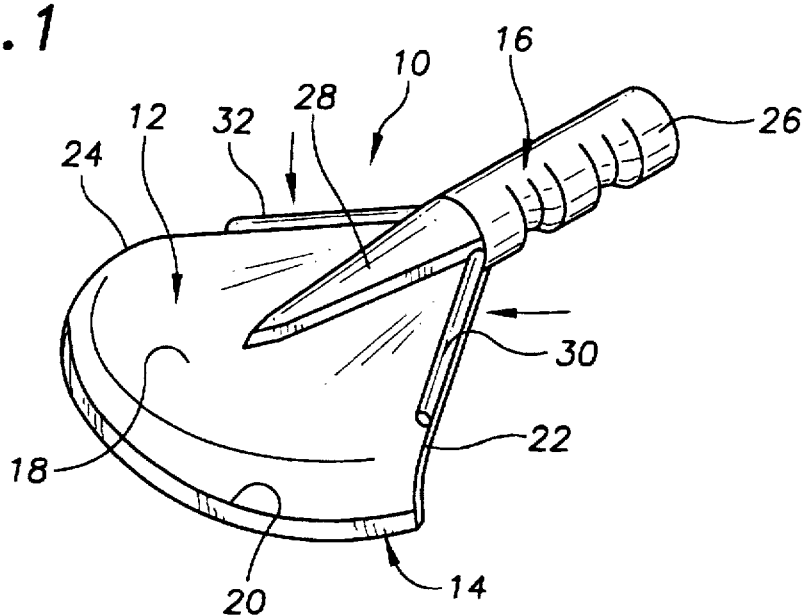
FIG. 1 is a perspective view of an exemplary embodiment of the wheel and wheel cover shield of the present invention showing the resilient shield member, the deformable edge contact band secured there along and extending past the shield edge and the handle assembly extending from the shield member including the hand grip, the rigid central support rib, the first deflectable support rib, and the second deflectable support rib.

FIG. 1 shows an exemplary embodiment of the wheel and wheel cover shield of the present invention generally designated by the numeral 10. Wheel and wheel cover shield 10 includes a resilient shield member, generally designated 12, a deformable edge contact band, generally designated 14, and a handle assembly, generally designated 16. Shield member 12 is molded from plastic and has the shape of a one-hundred degree section of a substantially pie shell shaped member. Shield member 12 is sufficiently resilient to resume its molded shape after a deforming force has been removed. Shield member 12 has an outwardly facing shielding surface 18 that is defined by a curved shield edge 20, a first straight side edge 22 and a second straight side edge 24. When shield member 12 is not deformed, curved shield edge 24 has a radius of curvature of sixteen inches.

Deformable edge contact band 14 is constructed from a strip of absorbent foam rubber and is adhesively secured along curved shield edge 20. Although adhesive is used in this exemplary embodiment, any method of securement commonly known in the art can be used to secure edge contact band 14 along curved shield edge 20. In this embodiment, edge contact band 14 extends past curved shield edge 20 by about one-half inch along the entire length of curved shield edge 20. This allows edge contact band 20 to contact and provide a water-tight seal against the edge of the wheel cover or wheel from tire cleaner runoff when excess tire cleaner is sprayed onto the tire surface. In use, shield member 12 prevents over spray from contacting the interior portion of the wheel cover or wheel.

In this embodiment, handle assembly 16 is integrally formed with shield member 12. Handle assembly 16 includes a hand grip 26, a rigid central support rib 28, a first deflectable support rib 30, and a second deflectable support rib 32. Hand grip 26 extends from shield member 12 at an angle of thirty degrees from the intersection of first and second straight side edges 22,24 to allow the user to comfortably hold shield member 12 in place during use.

First and second deflectable support ribs 30,32 are deflectable from a normal extended position inward toward central support rib 28 in a manner to change the curvature of curved shield edge 20 to a deflected radius of curvature that conforms to wheels having a radius measurement between sixteen and fourteen inches. Although a range between sixteen and fourteen inches is used in this exemplary embodiment, other ranges can be selected if desired.

Figure 2:
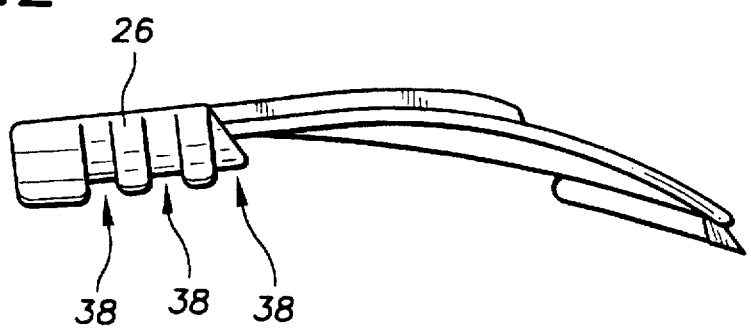
FIG. 2 is a side plan view of the exemplary wheel and wheel cover shield of FIG. 1 showing the resilient shield member, the deformable edge contact band secured along the interior shield edge of the shield member, the finger indents of the hand grip, the rigid central support rib, and the first deflectable support rib.
Figure 3:
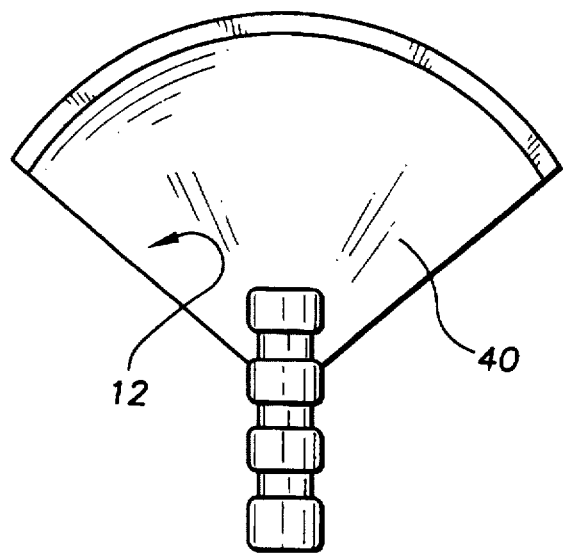
FIG. 3 is an underside plan view of the exemplary wheel and wheel cover shield of FIG. 1 showing the deformable edge contact band secured along the interior shield edge of the shield member and the finger indents of the hand grip.

With reference to FIG. 2, hand grip 26 includes three finger indents 38 for providing the user with a more positive grip on hand grip 26 during use. Referring to FIG. 3, an under surface 40 of shield member 12 is smooth to allow for easy cleaning when required.

Figure 4:
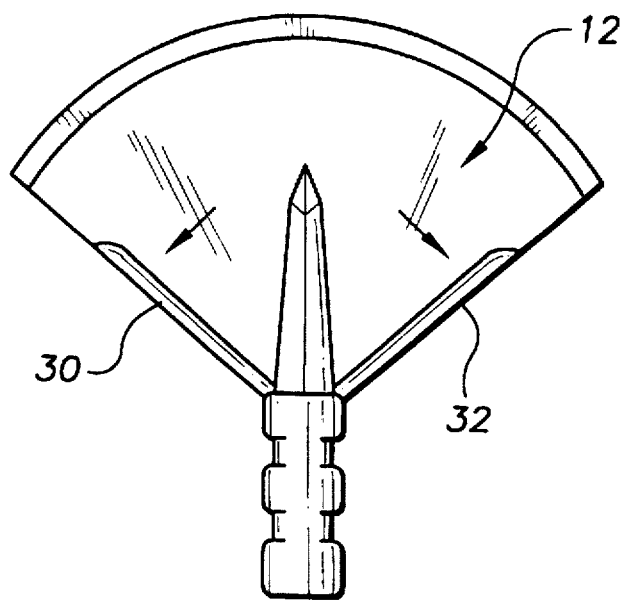
FIG. 4 is a first top plan view of the exemplary wheel and wheel cover shield of FIG. 1 showing the resilient shield member, the deformable edge contact band extending past the outwardly facing shield edge of the shield member, the finger indents of the hand grip, the rigid central support rib, and the first and second deflectable support ribs in the fully outwardly extended position used when spraying tire cleaning solution onto tires mounted on wheels and/or having wheel covers having a sixteen inch radius.
Figure 5:
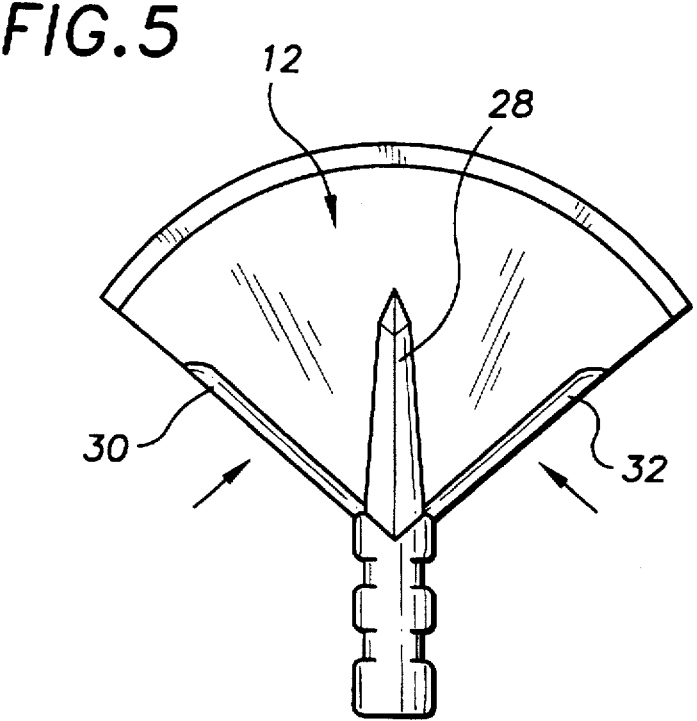
FIG. 5 is a second top plan view of the exemplary wheel and wheel cover shield of FIG. 1 showing the resilient shield member, the deformable edge contact band extending past the outwardly facing shield edge of the shield member, the finger indents of the hand grip, the rigid central support rib, and the first and second deflectable support ribs in the fully inwardly deflected position used when spraying tire cleaning solution onto tires mounted on wheels and/or having wheel covers having a fourteen inch radius.

FIG. 4 shows shield member 12 in the undeformed configuration with first and second deflectable support ribs 30,32 extended outwardly. FIG. 5 shows shield member 12 in the deformed configuration with first and second deflectable support ribs 30,32 deflected inwardly toward central support rib 28 causing curved shield edge 20 to assume a smaller radius curve for use on a wheel or wheel cover having a radius less than sixteen inches.

It can be seen from the preceding description that an automotive wheel and wheel cover shield has been provided that can be placed over at least a portion of an automotive wheel or wheel cover to protect the wheel or wheel cover from over spray while spraying tire cleaning solution onto the tires and that can be configured to work on a variety of different sized wheels and wheel covers.

It is noted that the embodiment of the automotive wheel and wheel cover shield described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An automotive wheel and wheel cover shield comprising:

a resilient shield member having a shielding surface defined partially by a curved shield edge and a shield surface area less than the surface area of the wheel or wheel cover to be protected, said shield edge having a deformable edge contact band secured there along and extending past the shield edge along the entire length of said curved shield edge; and a handle assembly extending from said shield member including a hand grip, a rigid central support rib in fixed connection with a central portion of an outwardly facing surface of said shield member, a first deflectable support rib in fixed connection with a first side edge portion of said outwardly facing surface of said shield member, and a second deflectable support rib in fixed connection with a second side edge portion of said outwardly facing surface of said shield member, said first and second deflectable support ribs being deflectable from a normal outwardly extending position in a manner to change the curvature of said shield edge to a deflected radius of curvature having a radius measurement between a first and a second predetermined radius value.

2. The automotive wheel and wheel cover shield of claim 1, wherein:

said curved shield edge is defined by a radius sweeping an angle greater than ninety degrees and less than one-hundred-twenty degrees.

3. The automotive wheel and wheel cover shield of claim 1, wherein:

said curved shield edge is defined by a radius of a length between fourteen and sixteen inches.

4. The automotive wheel and wheel cover shield of claim 1 wherein:

said hand grip extends from said shield member at an angle of thirty degrees from the intersection of a first and a second straight side edge partially defining said shield member.

5. The automotive wheel and wheel cover shield of claim 2, wherein:

said curved shield edge is defined by a radius of a length between fourteen and sixteen inches.

6. The automotive wheel and wheel cover shield of claim 2 wherein:

said hand grip extends from said shield member at an angle of thirty degrees from the intersection of a first and a second straight side edge partially defining said shield member.

7. The automotive wheel and wheel cover shield of claim 5 wherein:

said hand grip extends from said shield member at an angle of thirty degrees from the intersection of a first and a second straight side edge partially defining said shield member.

* * * * *